Figure 1:
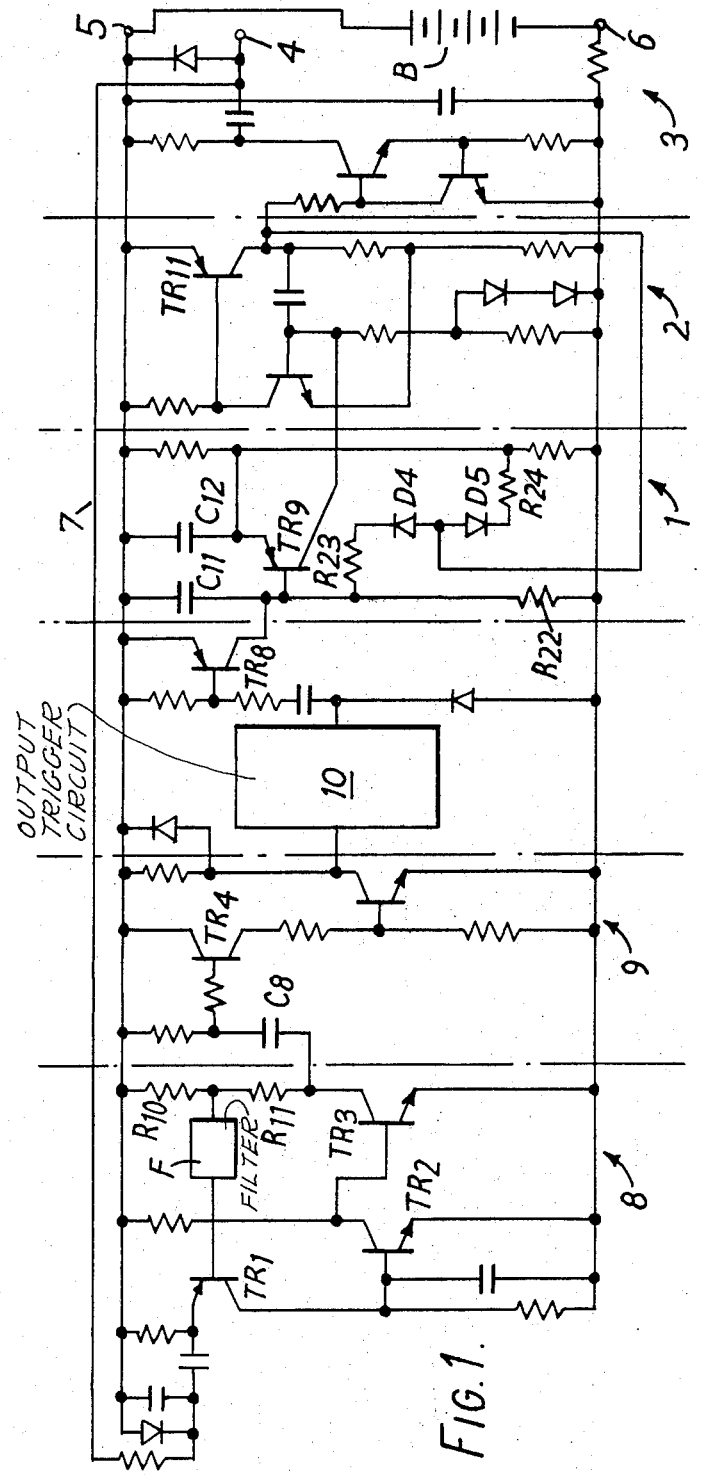

United States Patent [19]

Lale et al.

[11] 3,825,016

[45] July 23, 1974

[54] IMPLANTABLE CARDIAC PACEMAKER WITH BATTERY VOLTAGE-RESPONSIVE RATE

[75] Inventors: Peter Gilbert Lale, Harpenden; Denis John Becker, St. Albans, both of England

[73] Assignee: Devices Limited, Welwyn Garden City, England

[22] Filed: Feb. 28, 1972

[21] Appl. No.: 229,687

[52] U.S. Cl............................. 128/419 P, 128/421
[51] Int. Cl................................................ A61n 1/36
[58] Field of Search................ 128/419 P, 421, 422

[56] References Cited
UNITED STATES PATENTS
3,253,596   5/1966   Keller, Jr......................... 128/419 P
3,474,353   10/1969   Keller, Jr......................... 128/419 P
3,688,776   9/1972   Kenny ............................. 128/419 P FOREIGN PATENTS OR APPLICATIONS
1,067,538   10/1959   Germany......................... 128/419 P

*Primary Examiner*—William E. Kamm
*Attorney, Agent, or Firm*—Wenderoth, Lind & Ponack

[57] ABSTRACT

An implantable cardiac pacer including a voltage level detector for responding when the voltage of the pacer power source falls below a predetermined level. Response of the voltage detector gives a warning to the wearer in the form of increased pulse output rate.

4 Claims, 2 Drawing Figures

IMPLANTABLE CARDIAC PACEMAKER WITH BATTERY VOLTAGE-RESPONSIVE RATE

The invention relates to an implantable cardiac pacer. Such pacers generate stimulating pulses for the heart and are generally of four kinds, namely (a) demand pacers in which stimulating pulses are inhibited if the heart is beating naturally so that they are generated only when the heart stops or slows appreciably (b) fixed rate pacers in which pulses are continuously generated at a predetermined rate whether or not the heart is beating naturally (c) triggered pacers in which pulses are triggered by sinus signals to coincide with the natural heart beat and (d) fixed rate pacers controlled externally by a magnet which operates a magnetic switch. The present invention is applicable to all kinds of pacers.

An implantable pacer is energised by a power source which may be, for example, a battery of chemical cells usually mercury cells; a nuclear cell; a mechanism deriving electricity from muscle action or blood flow using, perhaps, a piezoelectric device; or a circuit for deriving current from a source external to the body by inductive or capacitive coupling. A piezoelectric or electrical coupling arrangement may be operated continuously to drive the pacer directly or intermittently to recharge a battery.

Whatever the nature of the power source it is a requirement that the voltage supply to the pacer must be maintained above a certain level for efficient operation. For one reason or another it is not always possible to achieve this. The problem is particularly acute with a chemical battery, which is the kind of power source most commonly used at present. Typically, the battery is constituted by four mercury cells which normally give an operating life of 2 or 3 years. Replacement of the battery requires a surgical operation. Such cells deteriorate in a manner which is not predictable and it is found that while some batteries may last for four years or so others will show serious signs of deterioration after only 1 year or less. It is customary at the present time to give periodic examinations which include a detailed analysis of an electrocardiograph of the patient in an attempt to determine the operating characteristics of the pacer. One of the principal objects of this examination is to determine the state of the battery. An object of the present invention is to provide an automatic means for indicating a fall in power source output without the need for a complex examination.

According to the invention there is provided an implantable cardiac pacer including a power source; means for generating stimulating pulses at a first rate which is approximately equal to the normal heat beat rate; and voltage detector means responsive to the output voltage of the power source and effective, on detection of an output voltage less than a predetermined voltage, to cause the pacer to generate stimulating pulses at a second rate appreciably higher than the first rate. Typically, the first rate may be 70 pulses per minute and the second rate 90 or 100 pulses per minute.

The high rate pulses stimulate the heart to beat at the high rate and do not conflict with the natural, sinus, stimulating signals. The patient is readily able to detect heartbeats at the high rate, either subjectively or by the customary periodic taking of his pulse.

A preferred embodiment of the invention is in a demand pacer in which there is a pulse generator which has an inherent rate at the high (second) frequency and a feedback path from the output of the pulse generator to its input, pulses fed through the feedback path from the output of the pulse generator being effective to slow the pulse generator to the first frequency. With this arrangement the voltage detector is preferably included in the feedback path and is effective to block the feedback path when the terminal voltage of the power source falls below the predetermined level. It will be seen that this arrangement has a "fail safe" factor since if the feedback path becomes ineffective for any other reason the pulse generator will automatically generate pulses at the high (warning) rate.

Preferably the voltage detector circuit comprises a direct coupled feedback amplifier including a filter, the feedback in the amplifier being so arranged that the standing voltage across the load of an output transistor of the amplifier is substantially constant, regardless of power source voltage. Because of this, the voltage excursions across the load given by feedback pulses are dependent upon the power source terminal voltage. Thus, if the power source voltage falls the pulse amplitude at the output of the amplifier also falls. The stage following the amplifier is preferably a trigger stage and the trigger level can be set so that when the power source voltage has fallen so that output pulses from the amplifier are lower than the trigger level of the trigger circuit, the feedback path is effectively blocked and no further feedback pulses are applied to the pulse generator.

Figure 2:
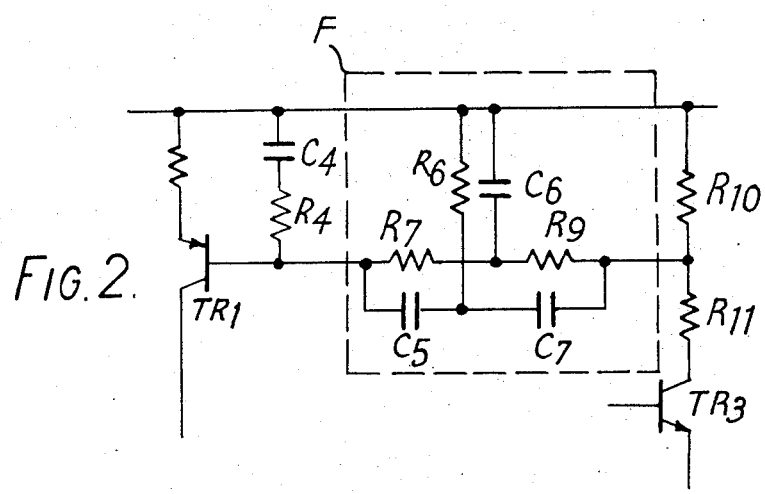

The invention will further be described with reference to the accompanying drawings, of which:

FIG. 1 is a circuit is a circuit diagram of an implantable pacer circuit embodying the invention; and FIG. 2 is a diagram of the filter circuit F of FIG. 1.

Referring to the drawing the pacer comprises a pulse generator 1, output pulses from which trigger a monostable circuit 2 which gives square pulses of 1 millisecond duration. The output from circuit 2 is applied to an output circuit 3 and thence to an active electrode 4. The active electrode is connected by means of a catheter lead to the heart muscle and receives from the pulse generator stimulating pulses which are negative with respect to an indifferent earth electrode 5. Such pulses are generated in the absence of natural (sinus) stimulating signals, and are effective to stimulate the heart.

The pacer runs from a battery B which is implanted in the body and which applies its terminal voltage between terminal 5 and a further terminal 6 which is negative with respect to terminal 5. The battery comprises four mercury cells which each have a nominal output voltage of 1.35 volts. Therefore, the nominal terminal voltage of the battery is 5.4 volts.

The pulse generator 1 comprises a resistance-capacitor circuit R22 and C11. The capacitor C11 charges through resistor R22 until the voltage across the capacitor reaches a sufficient value to switch on transistor TR9. The conduction of transistor TR9 triggers the monostable circuit 2 and a positive pulse of 1 millisecond duration is derived from the collector of transistor TR11. A local feedback signal from the collector of transistor TR11 is applied through a diode D4 and resistor R23 to partially discharge capacitor C11.

Assuming the transistor TR8 remains non-conducting, the cycle is then repeated and the arrangement constitutes a free-running relaxation oscillator which runs at an inherent frequency of 90 pulses per minute. In a manner to be described this inherent high rate is normally reduced to a lower rate of about 70 pulses per minute. Positive feedback signals are also applied to diode D5 and resistor R24 to charge a further capacitor C12. This affects the bias condition of transistor TR9, so determining the extent to which capacitor C11 must be charged to trigger the transistor.

The active electrode 4 picks up sinus signals from the heart as well as delivering stimulating pulses thereto. If a sinus signal is received on electrode 4 it is fed back along a lead 7 to an input amplifier 8, a trigger circuit 9 and a trigger output circuit 10. The output from circuit 10 is applied to transistor TR8 and this transistor is rendered conductive each time a pulse is received, thereby discharging capacitor C11 completely. If the heart is beating naturally a sinus signal will be effective to discharge capacitor C11 in each cycle before the capacitor voltage rises to the level sufficient to trigger transistor TR9. Under these circumstances, transistor TR9 will not trigger and stimulating pulses will thus be inhibited. The circuit including lead 7 and units 8, 9 and 10 is a feedback path from the output of the circuit 3 to input of the pulse generator.

Another function of the feedback path is to feed back output pulses from the output circuit resulting from pulses generated by the pulse generator. These pulses have the same effect as sinus signals and discharge capacitor C11. It will therefore be seen that capacitor C11, after triggering transistor TR9 is initially discharged to a first level by the local feedback path from the output of transistor TR11 and then is fully discharged by the output pulse fed back around the feedback path including lead 7. If capacitor C11 is thus fully discharged it takes longer to charge again to the trigger potential and therefore the pulse generation rate is slower than the inherent 90 pulses per minute. Therefore, if no sinus beats are being detected the pulse generator is restricted to run below its inherent rate of 90 pulses per minute to a rate of about 70 pulses per minute, corresponding to the natural heart rate.

It will be seen that if for any reason the feedback path of the pacer should become blocked then transistor TR8 will not be rendered conductive and output pulses will be generated at the high rate of 90 pulses per minute, whether or not the heart is beating naturally. The high rate output ensures that if the heart is beating naturally the stimulating pulses generated by the pulse generator do not conflict with the natural heartbeats since they are of a higher frequency. Nevertheless, the stimulating pulses will cause the heart to beat at the increased rate and this is readily detected subjectively by the patient or by actual measurement of the pulse rate. This high pulse rate is indicative of a fault in the pacer and the object of this embodiment of the present invention is to provide means whereby the feedback path is blocked automatically if the battery voltage falls below a predetermined level.

The voltage detection and blocking function is effected by means of amplifier 8. This is a direct coupled amplifier comprising three transistors TR1, TR2 and TR3 with a direct current feedback path from the output of transistor TR3 through a filter F to the input of transistor TR1. The filter F provides a means of adjusting the A.C. gain and frequency-response of the amplifier without affecting the direct current operating conditions of the amplifier. The feedback arrangement is self-adjusting to ensure that the standing voltage on the base of the transistor TR1 is about 0.45 volts. Since the current flowing into the base of TR1 is very small, the direct current potential developed across the direct current feedback path in the filter F is very small, and the voltage across R10 is also maintained at about 0.45 volts.

The currents through R10 and R11 are closely equal, and the voltage across R11 is therefore also kept constant. The load of transistor TR3 is constituted resistors R10 and R11 and the maintained level of the standing voltage across this load is 3.4 volts. This means that the voltage normally available across the transistor TR3 is 2 volts. The trigger circuit 9 is coupled to the collector of transistor TR3 through a capacitor C8. When the amplifier 8 receives an input pulse, the collector TR3 is subjected to a positive and a negative voltage excursion in succession. A negative going pulse of up to 2 volts amplitude will be passed through capacitor C8 to trigger the trigger circuit.

If the terminal voltage across terminals 5 and 6 should fall then because of the feedback in amplifier 8 the voltage across load R10, R11 is maintained nearly constant at 3.4 volts and almost the whole of the voltage fall is effective across transistor TR3. Thus, if the terminal voltage should fall to about 4 volts the voltage across TR3 will be only 0.6 volts. This is sufficient to give an output pulse through capacitor C8 of only about 0.5 volts amplitude. This is the limit at which the trigger circuit 9 is set and for pulses of below 0.5 volts the trigger circuit will not respond. Thus, if the terminal voltage falls below about 4 volts then no feedback pulses will be passed through the feedback path which will effectively become blocked. The pulse generator will therefore run at its high rate.

The value of 4 volts is chosen as a convenient value because it corresponds to the voltage at the output terminals if one cell fails completely. Usually one cell fails several weeks or even several months before the others fail. In cases where the cells do deteriorate together then 4 volts is a convenient level at which to give a warning. Even with a terminal voltage of 4 volts the pulse generator will run for a considerable time, thus giving an ample margin for replacement of the battery.

An additional feature of the circuit is the output trigger circuit 10 which is responsive to the frequency of pulses passing through the feedback path. If the pulse frequency is higher than a predetermined level, corresponding to the reception of interference signals rather than normal feedback pulses, then circuit 10 will effectively block the feedback path and allow the circuit to run at the high rate until the interference is removed.

Another feature of the circuit is the arrangement of the bias for transistor TR9. As was mentioned above, the local feedback path from the output of transistor TR11 to the junction of diodes D4 and D5 is effective, through diode D5, to control the bias on transistor TR9 by charging capacitor C12. The purpose of this is to allow adjustment of the delay before which a stimulating pulse is generated depending upon whether the heart is beating naturally or whether the pacer is generating output pulses. When sinus signals are being received the timing capacitor C11 is repetitively discharged through transistor TR8 and the emitter of transistor TR9 rests at a particular negative potential with respect to electrode 5. Under these circumstances the bias on transistor TR9 is such that the time taken for capacitor C11 to charge sufficiently to trigger the transistor corresponds to a pulse spacing for a frequency of about 60 pulses per minute. However, once transistor TR9 has been triggered a feedback pulse is supplied through diode D5 to capacitor C12. This reduces the negative bias on the emitter somewhat. Therefore, the time delay necessary to reach the trigger potential has been reduced slightly. This reduction is progressive and after several pulses have been generated the capacitor C12 is maintained at a lower charged potential which gives a pulse rate of about 70 pulses per minute, taking into account the feedback of output pulses around the feedback path including lead 7. With this arrangement although the normal stimulating rate is 70 pulses per minute the heart would be allowed to slow to about 60 pulses per minute during rest without initiating the generation of pulses from the pacer.

Referring now to FIG. 2 there is shown in greater detail the circuit configuration of the filter F of FIG. 1. The filter is a twin-T resistance-capacitance network comprising resistors R6, R7 and R9 and capacitors C5, C6 and C7. The filter circuit has a response such that maximum amplifier gain is at a frequency of about 30 Hz. A series circuit of a resistor R4 and a capacitor C4 is connected across the input to transistor VT1.

The invention is not restricted to the details of the embodiment described above. It is possible to render the feedback path inoperative in other ways then that described above. The amplifier 8 may be made inoperative in another way, or the trigger circuit 9 or trigger output circuit 10 may be rendered inoperative. An element in series with any part of the feedback path may be changed from a low to a high impedance of an element in parallel with any part of the feedback loop may be changed from a high to a low impedance. Furthermore, the filter F may be of different form from that shown. It may be a "bridged-T" type, for example. In some embodiments of the invention, where a tuned response is not required the filter may be replaced by a simple series resistor.

It may be desired to retain the ability of the pacer to respond to sinus signals from the heart, even at or below the critical supply voltage. This would require that the feedback loop is not rendered inoperative. A different method of generating high-rate pulses may then be used. The voltage detector may be arranged to switch a transistor in response to voltage fall, perhaps detected by comparison with a zener diode reference, the transistor being then effective to shorten the time constant of the pulse generator.

We claim:

1. An implantable cardiac pacer including a power source, pulse generating means connected to the power source to derive power therefrom for generating stimulating pulses at a first rate which is approximately equal to the normal heart beat rate and for generating stimulating pulses at a second rate appreciably higher than said first rate, output electrode means coupled to said pulse generating means to which the output of said pulse generating means is supplied, a pulse rate control circuit means which forms part of the pulse generating means normally controlling said pulse generating means for generating pulses at said first rate and which in the absence of an input thereto permits said pulse generating means to generate stimulating pulses at said second rate, and voltage detector means connected to the power source and responsive to the output voltage of the power source, the voltage detector means being coupled to the pulse rate control circuit means to supply an input to the pulse rate control circuit means only on detection of an output voltage at least as high as a predetermined voltage to cause the pacer to generate stimulating pulses at said first rate, whereby when said voltage detector means fails to detect the predetermined voltage, it fails to generate an input for the pulse rate control circuit and the pulse generating means generates stimulating pulses at said second rate.

2. An implantable cardiac pacer as claimed in claim 1 wherein the first rate is substantially 70 pulses per minute and the second rate is substantially 90 pulses per minute.

3. An implantable cardiac pacer as claimed in claim 2 which is a demand pacer and which has input electrode means which receive sinus signals from the heart, a trigger circuit means coupled between said input electrode means and said pulse rate control circuit to actuate said pulse rate control circuit to inhibit operation of said pulse generating means on receipt of such sinus signals to prevent generation of stimulating pulses, a feedback circuit means coupled between the output of said pulse generating means and said trigger circuit for controlling said pulse rate control circuit for controlling said pulse generating means in response to output pulses fed back through said feedback circuit means for generating pulses at said first rate, said voltage detector means being connected in said feedback circuit means for blocking supply of said output pulses through said feedback circuit means upon failure to detect the predetermined voltage.

4. An implantable cardiac pacer as claimed in claim 3 in which said voltage detector means comprises a direct-coupled amplifier in series in the feedback circuit means and including an output transistor, an internal feedback circuit means from the output transistor to the amplifier input, whereby feedback by way of the internal feedback circuit means is effective to maintain a constant bias at the output transistor, regardless of supply voltage, so that output pulse amplitude from the amplifier is dependent on supply voltage, said trigger circuit being responsive only to those output pulses from said amplifier which are above a predetermined amplitude.

* * * * *